United States Patent
Wu

(10) Patent No.: US 8,189,572 B2
(45) Date of Patent: May 29, 2012

(54) SYSTEMS AND METHODS FOR RESETTING A NETWORK DEVICE

(75) Inventor: Jingsong Wu, Jersey City, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1428 days.

(21) Appl. No.: 11/614,351

(22) Filed: Dec. 21, 2006

(65) Prior Publication Data

US 2008/0151866 A1   Jun. 26, 2008

(51) Int. Cl.
*H04L 12/66* (2006.01)

(52) U.S. Cl. ........ 370/356; 370/351; 370/352; 370/353; 370/354; 370/355; 709/223; 709/224

(58) Field of Classification Search .................. None
See application file for complete search history.

(56) References Cited

U.S. PATENT DOCUMENTS

| 6,707,914 | B1* | 3/2004 | Bell .............................. 380/46 |
| 2005/0038880 | A1* | 2/2005 | Danforth ..................... 709/222 |
| 2005/0235352 | A1* | 10/2005 | Staats et al. .................. 726/14 |
| 2006/0182282 | A1* | 8/2006 | Negahdar ..................... 380/277 |
| 2008/0062962 | A1* | 3/2008 | Luck et al. .................... 370/352 |
| 2008/0082594 | A1* | 4/2008 | Soltes et al. .................. 707/204 |
| 2008/0215450 | A1* | 9/2008 | Gates et al. ................... 705/26 |

* cited by examiner

*Primary Examiner* — Jae Y Lee

(57) ABSTRACT

A network device includes a data store with first and second parameters, the first parameter affecting a communication operation of the network device and the second parameter affecting a security operation of the network device. A device reset function enables a user to selectively and independently refresh the first and second parameters. For example, a Session Initiation Protocol (SIP) device user can restore a default communications configuration of the SIP device while preserving the device decryption key.

20 Claims, 3 Drawing Sheets

SYSTEMS AND METHODS FOR RESETTING A NETWORK DEVICE

BACKGROUND

Voice over Internet Protocol (VoIP) telephony is just one of myriad communications services provided via packet-switched networks today. To utilize these many services, end users employ computing devices (e.g., personal computers or dedicated Internet Protocol (IP) telephones) for network access. Such end user devices are known as customer premises equipment (CPE).

CPE is often provided to an end user in an unprovisioned state, such that the CPE is not initially configured to access and use the network services to which the end user has subscribed. For example, when an end user purchases a Session Initiation Protocol (SIP) telephone, the telephone typically is not initially configured with the telephone number and/or the particular service features (e.g. call waiting, caller ID) which will make up the end user's subscription. Rather, the end user's service provider typically registers and provisions the SIP phone remotely when the end user first connects the SIP phone to the service network.

To accomplish remote provisioning, one or more configuration files are provided to the CPE via the service network. The CPE then uses parameters included in the configuration file(s) to register with the service network and to access the services to which the end user has subscribed. As an example, U.S. patent application Ser. No. 11/472,388, filed Jun. 22, 2006, entitled "Methods and Systems for Securely Configuring a Network Device" and incorporated herein in its entirety by reference, describes a secure method for distributing CPE configuration files while avoiding thefts of service by man-in-the-middle attacks.

Once initial provisioning is complete, additional configuration files may be used to adjust the parameters of the CPE (e.g., to effect a change in the end user's subscription). Additionally, the CPE end user and/or the service provider may have occasion to reset the CPE (e.g., to return a device to a known previously operative default state, or for purposes of running device diagnostics). However, known methods of resetting CPE are inflexible and can sometimes produce undesired results. Consequently, there is a need for improved systems and methods of configuring and resetting network devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION

The security and cost associated with provisioning CPE are significant concerns of many service providers. Unprotected remote provisioning of CPE provides unscrupulous persons with opportunity for gaining unauthorized access to network services and/or to the CPE. However, there are reasons why remote provisioning is preferred by many service providers, including the substantial costs associated with pre-provisioning the CPE before it is provided to end users.

Accordingly, service providers have sought to develop different technologies for securing communications related to remote provisioning of CPE. For example, some service providers encrypt configuration files used for remote provisioning of CPE. Encryption generally relies upon an encryption/decryption key, which is commonly known as a symmetric key, or a pair of complementary encryption keys, which are commonly known as a public key and a private key.

Decryption keys are provided to the CPE so that provisioning configuration files can be decrypted. The decryption keys are either preloaded in the CPE or distributed to the CPE as part of provisioning, as is known.

Decryption keys are conventionally considered part of the overall configuration profile of CPE. Consequently, when CPE is reset (e.g., to return a device to a known previously operative default state, or for purposes of running device diagnostics), the CPE decryption key is also conventionally reset. However, this can be extremely costly for a communications service provider, particularly when thousands or even millions of CPE devices are supported in connection with widespread services such as residential and enterprise VoIP.

Advantageously, exemplary embodiments enable CPE communication parameters (e.g., parameters defining a CPE user's service subscription) to be reset independently of CPE security parameters such as decryption keys. When a CPE user or a service provider chooses to reset, refresh or reconfigure CPE communication parameters, a determination is made as to whether the CPE security parameters (e.g., one or more decryption keys) are to be preserved. If so, then only the CPE communication parameters are reset (e.g., restored to a default state at the CPE or refreshed via a configuration file sent to the CPE by the service provider). If not, then the CPE security parameters are refreshed along with the CPE communication parameters (e.g., a default decryption key may be restored at the CPE or a new decryption key may be distributed to the CPE by the service provider). As a result, a service provider can accommodate the frequent need for device resets and reconfigurations (e.g., so that a user may change a subscription, or so that a device can be re-initialized when changing hands from one user to another, etc.), without having to disrupt an extant, cost-efficient and still workable distribution of decryption keys.

Figure 1:
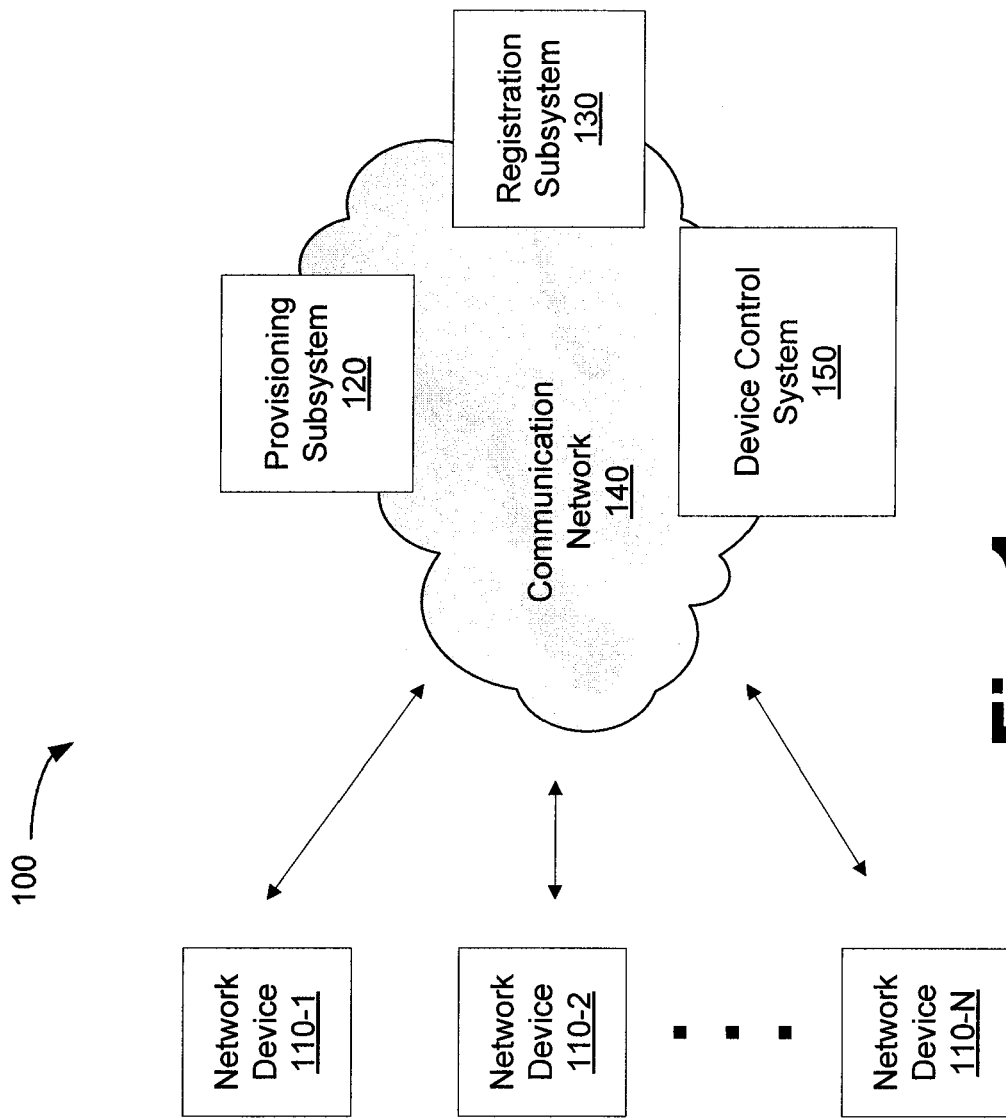
FIG. 1 depicts a system for registering, remotely configuring and/or resetting a network device consistent with exemplary embodiments.

FIG. 1 illustrates a communications system 100 consistent with exemplary embodiments. As shown, system 100 may include one or more network devices 110-1 through 110-N (collectively "the network devices 110") communicatively coupled to a provisioning subsystem 120, a registration subsystem 130 and a device control system 150, via a communications network 140.

The elements of the system 100 may communicate using any known communication technologies, devices, media, and protocols supportive of voice and/or data communications, including, but not limited to, the Internet, intranets, local area networks, Voice over Internet Protocol ("VoIP") networks, packet-switched networks, circuit-switched networks, other communications networks, data transmission media, communications devices, Transmission Control Protocol ("TCP"), Internet Protocol ("IP"), File Transfer Protocol ("FTP"), Trivial File Transfer Protocol ("TFTP"), User Datagram Protocol ("UDP"), telnet, Hypertext Transfer Protocol ("HTTP"), Hypertext Transfer Protocol Secure ("HTTPS"), socket connections, and other suitable communications technologies.

The communication network 140 may include any devices, media, and other network technologies for enabling communications between the network devices 110 and the provisioning subsystem 120, the registration subsystem 130 and the device control system 150, as represented by arrows in FIG. 1. In certain embodiments, the communication network 140 supports voice and/or data communications between the elements of the system 100. The communication network 140 may include, but is not limited to, the Internet, intranets, local area networks, wide area networks, packet-switched networks (e.g., Voice over Internet Protocol ("VoIP") networks), circuit-switched networks (e.g., the Public Switched Telephone Network ("PSTN"), and integrated packet-switched and circuit-switched networks (e.g., integrated VoIP and PSTN networks).

One or more service providers provide network services over the communication network 140. Examples of the network services include, but are not limited to, voice services (e.g., Plain Old Telephone Service ("POTS"), VoIP telephone services, and long-distance telephone services), data services, network access services (e.g., Internet access services), content delivery services, media content services (e.g., audio, video, or audiovisual programming), subscription services, and any other services that may be provided over a network.

The provisioning subsystem 120, the registration subsystem 130 and the device control system 150 may include any suitable communication technologies for communicating with the network devices 110 over the communication network 140 and may comprise any combination of hardware, software, and firmware configured for provisioning, registering and resetting/reconfiguring network devices 110 to thereby enable device access to services provided over the communication network 140, as is well known.

Generally, the provisioning subsystem 120 provides encrypted configuration files to the devices 110, and the registration subsystem 130 controls access to the services provided over the communication network 140 (i.e., network devices 110 register with the registration server 130 in order to gain access to network services). In certain embodiments, the provisioning subsystem 120 and the registration subsystem 130 are implemented on or include one or more provisioning and registration servers, respectively.

Generally, the device control system 150 permits network- or web-based access to the network devices 110 for purposes of device reconfiguration, diagnostics, etc. For example, device control system 150 can be, or can include, a web portal, and a user of a network device 110 (e.g., a VoIP customer) can use the web portal to adjust certain device settings, as is known (e.g., to effect changes in his or her subscription). Similarly, a service provider agent (e.g., a call center agent) can use a web portal, either at the behest of a user of a network device 110 or as instructed by the service provider itself, to adjust device settings as is known (e.g., to effect changes in a user's subscription or to perform device resets, testing, etc.). Alternatively, the device control system 150 can be, or can include, one or more network servers (e.g., UNIX servers) or other networked computing device(s) programmed to carry out automated reconfigurations, diagnostics, etc., of the network devices 110, as is known.

The network devices 110 may include any device or devices capable of accessing one or more network services provided over the communication network 140 and/or any device or devices capable of communicating via the communication network 140. For example, the network devices 110 may include, but are not limited to, one or more desktop computers, laptop computers, tablet computers, handheld devices, personal data assistants, mobile telephones (e.g. cellular telephones), IP-enabled devices (e.g., IP telephones), session initiation protocol ("SIP") enabled devices (e.g., SIP telephones), mobile IP telephones, mobile SIP telephones, Voice over Internet Protocol ("VoIP") enabled devices, analog telephone adaptors ("ATAs"), satellite pagers, wireless internet devices, embedded computers, video phones, mainframe computers, mini-computers, servers, gateways, routers, switches, workstations, network interface cards, programmable logic devices, entertainment devices, gaming devices, computing devices operating soft-phones, and any other device capable of accessing network services over the communication network 140. The network devices 110 may also include various peripherals such as a terminal, keyboard, keypad, mouse, screen, printer, stylus, input device, output device, microphone, speaker, sound card, or any other apparatus or interface that can facilitate use of the network devices 110 by human operators.

In certain embodiments, each of the network devices 110 includes an encryption/decryption key (referred to as the "decryption key") useful for encrypting and/or decrypting messages sent to and/or received from the provisioning subsystem 120. Among other uses, the decryption keys are useful for decrypting configuration profiles encrypted by and received from the provisioning subsystem 120.

The network devices 110 may be manufactured by one or more third party vendors, and a service provider may instruct any of the third parties to preload a decryption key in each of the network devices 110. This allows communications associated with both the initial provisioning and any subsequent provisioning of each of the network devices 110 to be encrypted. In addition or as an alternative to the preloading of decryption keys, decryption keys may be downloaded to the network devices 110 over the communication network 140 using known techniques.

In certain embodiments, each of the network devices 110 includes a common (i.e., the same) decryption key. Alternatively, different groups of the network devices 110 may include different decryption keys. For example, network devices 110 manufactured by a first party may include a first decryption key, and network devices 110 manufactured by a second party may include a second decryption key. It is also anticipated that a unique decryption key may be preloaded and/or downloaded in each of the network devices 110 for implementations in which security concerns outweigh concerns with cost.

The network devices 110 may be provided to subscribers in an unprovisioned state. In such case, the network devices 110 are preconfigured to communicate with the provisioning subsystem 120 when connected to the communication network 140. For example, a network address (e.g., a Uniform Resource Locator ("URL") or Fully Qualified Domain Name ("FQDN")) associated with the provisioning subsystem 120 may be preloaded in the network devices 110 such that the network devices 110 are able to send messages to the provisioning subsystem 120 when connected to the communication network 140.

When communications between the network devices 110 and the provisioning subsystem 120 have been established, the network devices 110 are prepared to be provisioned by receiving, verifying, and loading configuration profiles received from the provisioning subsystem 120. The decryption keys included in the network devices 110 allow data communicated between the network devices 110 and the provisioning subsystem 120 to be encrypted.

The provisioning subsystem 120 may include and/or generate configuration profiles (e.g., one or more configuration data files) having parameters that when loaded by the network devices 110, configure the network devices 110 for particular services and/or service features provided over the communication network 140. As is well-known, configuration profiles may be defined to provide access to particular services or service packages that correspond with respective service subscriptions.

For instance, a first subscriber may order a first service package from a service provider. The service provider creates a subscription profile descriptive of the features and services to be provided to the subscriber under the subscription. Such a configuration profile includes parameters that correspond with the subscription profile so that when the configuration profile is received and loaded by a particular network device 110, the network device 110 is provisioned to access the services and features included in the subscription.

The provisioning subsystem 120 may create configuration profiles at any suitable times or in response to predefined events (e.g., receipt of requests from network devices 110). In certain embodiments, the provisioning subsystem 120 is configured to generate configuration profiles in response to receiving activation requests from users associated with the network devices 110. For example, a user may subscribe to one or more network services provided over the communication network 140. The user is provided with or otherwise obtains a particular network device 110 for accessing the network services. The user may activate the network device 110 by providing a unique identifier associated with the network device 110 (e.g., a serial number or a Media Access Control, or MAC, address) to the provisioning subsystem 120. This may be done in any suitable manner such as the user accessing the provisioning subsystem 120 over the communication network 140 and providing one or more messages including the unique device identifier. In certain embodiments, for example, the user is able to provide the device identifier through a web portal hosted by the provisioning subsystem 120 (e.g., via a web portal such as one included in device control system 150 of FIG. 1). Of course, any other suitable way of providing the device identifier to the provisioning subsystem 120 may be used, including, but not limited to using a telephone call, a text message, or an e-mail message to communicate the device identifier to the provisioning subsystem 120. The user may use the network device 110 or any other suitable device to provide the device identifier to the provisioning subsystem 120.

The provisioning subsystem 120 is configured to use data included in activation requests to generate configuration profiles. The provisioning subsystem 120 may include one or more encryption keys (e.g., private keys) for encrypting configuration profiles. In certain embodiments, the provisioning subsystem 120 is able to use a single encryption key for encrypting configuration profiles for all of the network devices 110. In other embodiments, the provisioning subsystem 120 uses multiple encryption keys for encrypting configuration profiles for the network devices 110.

The provisioning subsystem 120 may store the configuration profiles for future use, including providing the configuration profiles to respective network devices 110 in response to receiving provisioning requests from the network devices 110. Additionally or alternatively, the provisioning subsystem 120 may be configured to provide configuration profiles to respective network devices 110 periodically or in response to other predefined events such as the updating of configuration profiles.

The provisioning subsystem 120 may receive provisioning requests from the network devices 110 over the communication network 140. From data included in the provisioning requests, the provisioning subsystem 120 can identify corresponding configuration profiles to be provided to the network devices 110. In certain embodiments, for example, a provisioning request received from a network device 110 includes a name of a configuration file, where the name of the file includes the MAC address of, or other unique identifier associated with, the network device 110 and an indication of the type of file (e.g., "<mac>.cfg" where "<mac>" is the MAC address of the network device 110). Of course, other suitable identifiers (e.g., subscriber or subscription identifiers) may be used to identify corresponding configuration profiles.

The provisioning subsystem 120 is configured to provide the identified configuration profiles to the corresponding network devices 110. The configuration profiles may be transmitted to the network devices 110 over the communication network 140. A network device 110 in receipt of a configuration profile is configured to load the configuration profile and thereby provide subscribed services to a device user.

The provisioning subsystem 120 is not limited to generating and providing configuration profiles in the manner described above. For example, if the provisioning subsystem 120 does not include a pre-generated configuration profile requested in a provisioning request received from a particular network device 110, the provisioning subsystem 120 may be configured to dynamically generate the configuration profile in response to the provisioning request. Configuration profiles may also be dynamically encrypted.

Once a particular network device 110 has been provisioned, it can thereafter be reconfigured and/or reset remotely (e.g., via a web portal or via dedicated servers such as may be included in device control system 150). For example, as noted above, a user or a service provider call center agent may wish to effect a change to a device user's subscription and/or carry out device diagnostics, either of which may call for a device reset. According to exemplary embodiments, the network devices 110 can be reset without disrupting the device decryption keys, as is described in detail hereinafter.

Figure 2:
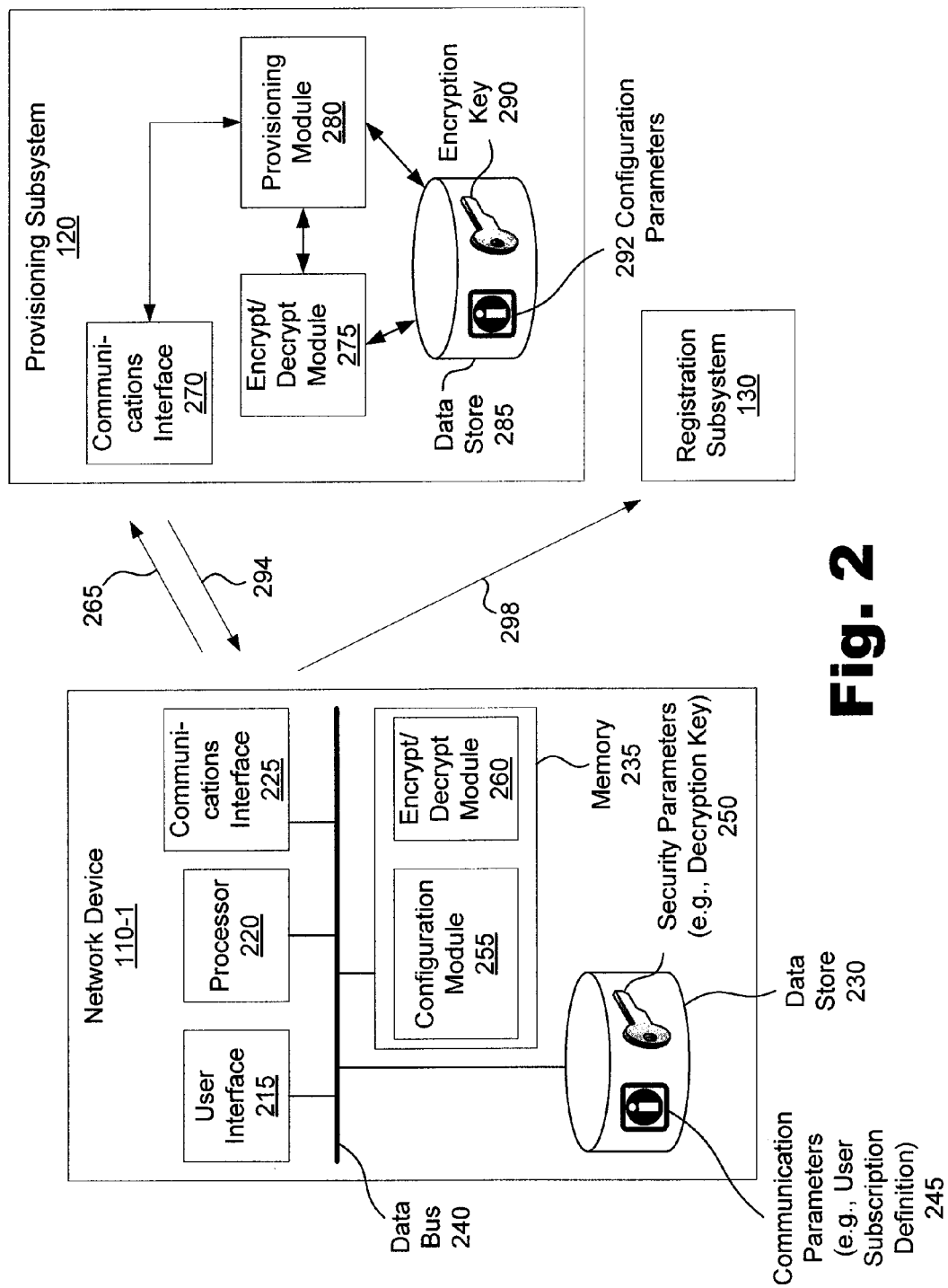
FIG. 2 depicts exemplary communication between, as well as exemplary components of, certain elements of the system of FIG. 1.

FIG. 2 illustrates exemplary communications between, as well as exemplary components of, certain elements of the system 100, according to an embodiment. As shown in FIG. 2, network device 110-1 may include a user interface 215, processor 220, communications interface 225, data store 230, and memory 235 communicatively coupled to one another by a data bus 240. The user interface 215 may include any suitable technologies for facilitating communications with a user of the network device 110-1, and the communications interface 225 may include any suitable technologies for facilitating communications with the provisioning subsystem 120.

The data store 230 and the memory 235 may include any suitable technologies for storing and accessing electronic data, including one or more databases and caches, for example. The data store 230 may hold suitable device identifiers such as a MAC address and/or serial number, etc. Additionally, as shown in FIG. 2, the data store 230 may also include communication parameters 245 (e.g., parameters impacting the manner in which the device operates and/or the nature of the device user's subscription) as well as security parameters 250 (e.g., the above described device decryption keys). The memory 235 may include a configuration module 255 and an encrypt/decrypt module 260 (also referred to as the "encryption module 260"). The processor 220 may execute computer-readable instructions stored in the data store 230 and/or the memory 235, as is well known. In particular, the processor 220 may perform computer-readable instructions (e.g., software applications) associated with the configuration module 255 and the encrypt/decrypt module 260.

In association with subscribing to network services provided over the communication network 140, a user of the network device 110-1 typically activates the network device 110-1. This typically includes the user providing the device identifier to the provisioning subsystem 120, which may be done in any of the ways described above. A configuration profile for the network device 110-1 may be defined using subscription parameters associated with the network services and features subscribed to by the user of the network device 110-1 and the unique device identifier provided to the provisioning subsystem 120. The configuration profile may be defined in any of the ways described above, and may be accomplished by manual and/or automatic procedures. Typically, the configuration profile is assigned an identifier (e.g., a profile name) that includes or is based on the corresponding device identifier.

As shown in FIG. 2, the provisioning subsystem 120 includes a communication interface 270, an encrypt/decrypt module 275 (also referred to as the "encryption module 275"), a provisioning module 280, and a data store 285 communicatively coupled to one another as shown. The data store 285 may include an encryption key 290. The communications interface 270 may receive the activation request and provide the request to the provisioning module 280 for further processing. The provisioning module 280 may generate, or at least help generate, a configuration profile 292 for the network device 110-1.

The configuration profile having the appropriate device identifier may be provided to the encrypt/decrypt module 275, which can use the encryption key 290 to encrypt the configuration profile. In certain embodiments, the encrypted configuration profile is stored to the data store 285. In other embodiments, the configuration profile may be stored in the data store 285 prior to being encrypted. Either way, the configuration profile is ready to be retrieved and used to provision the network device 110-1 for accessing the network services subscribed to by the user of the network device 110-1.

Network device 110-1 may initiate a provisioning operation by sending a provisioning request 265 to the provisioning subsystem 120. The configuration module 255 may generate the request 265, which may be transmitted to the provisioning subsystem 120 by way of the communications interface 225. The request 265 may include, among other information, data representative of or derived from the above noted device identifier, which is useful for identifying the network device 110-1 and the configuration profile associated with the network device 110-1. In certain embodiments, the device identifier includes the MAC address of the network device 110-1 on the communication network 140.

The provisioning subsystem 120 is configured to receive the provisioning request 265. More specifically, the communications interface 270 may receive and forward the request 265 to the provisioning module 280 for further processing. The provisioning module 280 is configured to use the data included in the request 265 to identify an appropriate configuration profile (or configuration profiles) to be provided to the network device 110-1 in response to the request 265. For example, the provisioning module 280 may use the received device identifier, or data derived from the device identifier, included in the request 265 as a parameter for searching the data store 285 for one or more configuration profiles (e.g., configuration profile 292) that have been predefined as being associated with the device identifier. In this manner, the provisioning subsystem 120 is able to identify the configuration profile that includes parameters representative of appropriate settings that will allow the network device 110-1 to access the specific network services and features subscribed to by the user of the network device 110-1.

In embodiments in which the configuration profile 292 has been encrypted previous to the receipt of the provisioning request 265, the identified configuration profile 292 may be retrieved and provided to the communications interface 270 for transport to the network device 110-1. In embodiments in which the configuration profile 292 has not been encrypted previous to the receipt of the provisioning request 265, the configuration profile 292 may be retrieved and dynamically encrypted before being provided to the network device 110-1. For example, the provisioning module 280 may send the configuration profile 292 to the encrypt/decrypt module 275, which uses the encryption key 290 to encrypt the configuration profile 292 and returns the encrypted configuration profile 292 to the provisioning module 280. Any suitable encryption technologies may be used to encrypt (and decrypt) configuration profiles, including Advanced Encryption Standard ("AES").

Once the appropriate configuration profile (e.g., configuration profile 292) has been identified and encrypted (either previously or dynamically), the provisioning subsystem 120 sends the encrypted configuration profile to the communications interface 270, which is configured to send the encrypted configuration profile to the network device 110-1 over the communication network 140, as represented by arrow 294 in FIG. 2.

If an appropriate configuration profile is not found in the data store 285, the provisioning module 280 may be configured to search an external data source for a subscription, subscriber, or configuration profile associated with the device parameter 245 included in the request 265. If a subscription or subscriber profile is found, the provisioning module 280 and the encrypt/decrypt module 275 may be configured to use the profile to dynamically generate and encrypt a configuration profile corresponding to device identifier.

The communications interface 225 of the network device 110-1 receives the encrypted configuration profile, which is decrypted by the encrypt/decrypt module 260 using the decryption key 250. The configuration module 255 then loads the configuration profile to configure the network device 110-1 for accessing network services. Specifically, with the configuration profile loaded, the network device 110-1 is able to communicate with the registration server 130 as represented by arrow 298 to initiate registration of the network device 110-1 for accessing network services over the communication network 140 in accordance with a subscription corresponding to the configuration profile.

Thereafter, a user of the network device 110-1 and/or a service provider operating the provisioning subsystem 120 and/or the registration subsystem 130 may have occasion to reset or refresh the network device 110-1. The user can initiate such a reset/refresh, for example, via a user interface of the network device 110-1 (e.g., via a dedicated external pushbutton or other mechanism, or via a menu selection on a user interface of the network device 110-1). Alternatively, the user and/or the service provider can initiate such a reset/refresh via a web portal or via a dedicated server such as may be included in device control system 150. No matter how initiated, the reset/refresh can be accomplished directly at the network device 110-1 (e.g., via internal software, firmware and/or hardware response to the reset request) or remotely (e.g., via transmission of a configuration file from the provisioning subsystem 120 as described above). Also, no matter how initiated, and no matter whether carried out at the device or remotely, such a reset/refresh can result in device parameters being restored to default values or set to new values.

In conventional systems, such a reset/refresh would impact all programmable device parameters, including the communications parameters 245 (e.g., the device user's subscription definition) and the security parameters 250 (e.g., the device decryption key). However, according to exemplary embodiments, communications and security parameters are reset/refreshed selectively and independently, for example to enable frequent device resets while preserving existing, widely distributed and still serviceable decryption keys.

Figure 3:
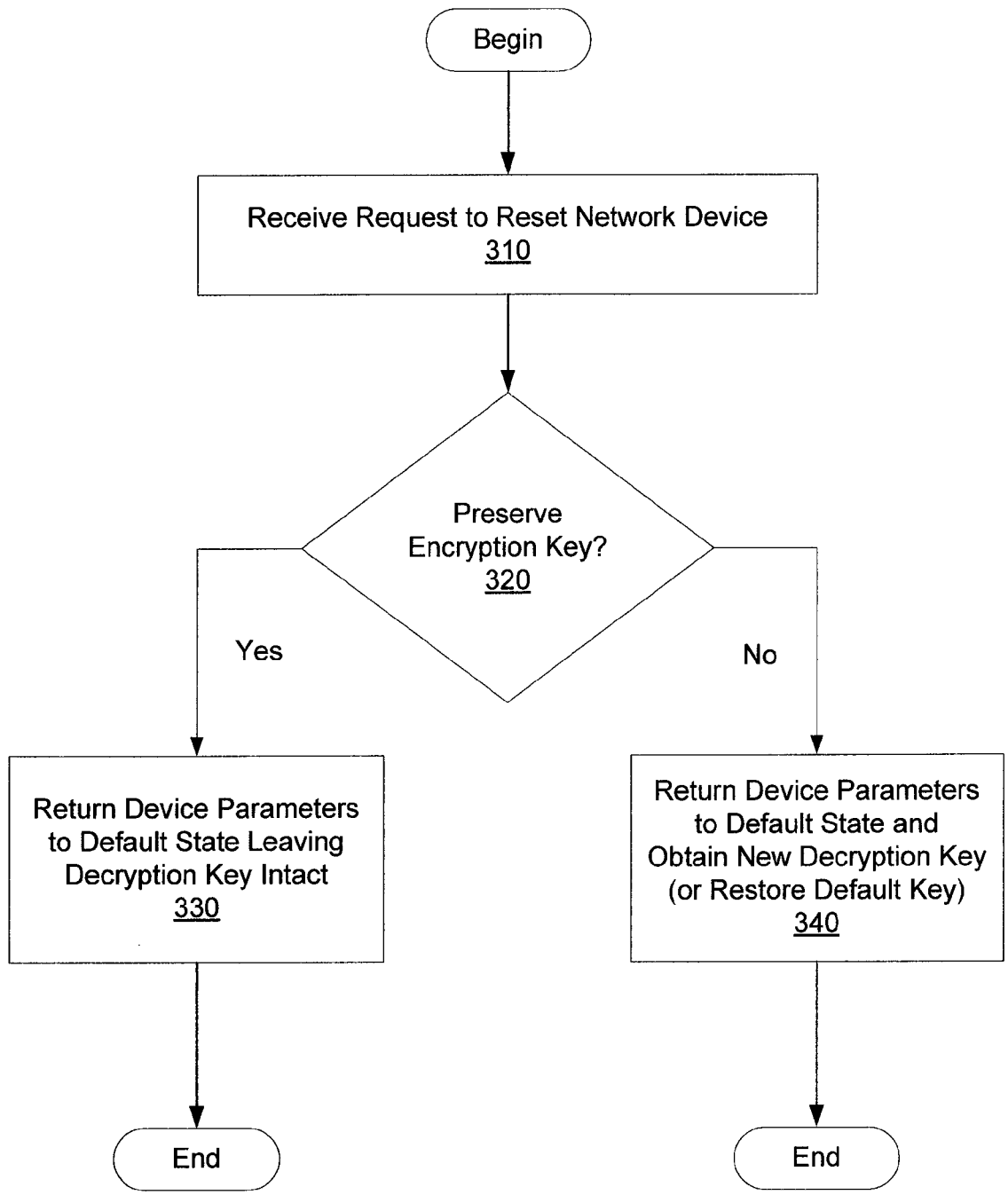
FIG. 3 is a flowchart illustrating a method of resetting a network device consistent with exemplary embodiments.

FIG. 3 illustrates an exemplary method of resetting a network device (e.g., network device 110-1 of FIGS. 1 and 2). While FIG. 3 illustrates exemplary steps according to one embodiment, other embodiments may omit, add to, modify and/or reorder any of the steps shown in FIG. 3.

In step 310, a request for a device reset/refresh is received (e.g., at the device itself as a result of user input via pushbutton, menu selection or the like, or by a remote service provider as a result of user input at the device or via, for example, a web portal as described above).

Thereafter, at step 320, a determination is made as to whether device security parameters (e.g., a device decryption key or keys) should be preserved during the reset/refresh. For example, the requestor of the reset/refresh (e.g., the device user or a call center agent) can be queried (e.g., via a user interface at the device or via a remote portal, as appropriate) as to his or her preference at the time the reset is initiated. Alternately, the requestor's preference can be included in a data store (e.g., in a local device data store such as data store 230 and/or a remote data store such as data store 285) and then recalled upon initiation of a device reset/refresh. Such a preference can, for example, be pre-set for a device, set upon initial provisioning of a device, and/or set for an already operable device via remote reconfiguration as described above. According to exemplary embodiments, both a user preference and a service provider preference can be considered upon receipt of a reset/refresh request (e.g., with the service provider preference prevailing at particular times as dictated by the service provider, with or without notice to the user as the service provider deems appropriate).

Returning to FIG. 3, if it is determined at step 320 that device security parameters (e.g., device decryption keys) are to be preserved during device reset/refresh, then appropriate device parameters such as communication parameters (e.g., subscription definitions) are reset/refreshed, at step 330, while device security parameters are left intact. However, if it is determined at step 320 that device security parameters need not be preserved, then device security parameters are reset/refreshed along with other device parameters such as communication parameters at step 340. When device parameters, whether communication and/or service parameters, are reset/refreshed according to exemplary embodiments, they can be restored to a default state or set to new values using known techniques. User and/or service provider preferences regarding restoration of defaults versus setting new values can be fixed a priori or determined at time of reset/refresh (e.g., by querying the requester).

The above-described exemplary systems and methods provide flexibility in resetting network devices. The foregoing description of these exemplary systems is presented to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A network device comprising:
a memory that stores programmable communications parameters and a decryption key;
a module that:
generates a request, including information based on an identifier associated with the device, for transmission to a first server;
receives an encrypted configuration profile from the first server; and
transmits, in response to receiving the encrypted configuration profile, information to a second server to initiate registration of the device; and
an interface that receives, upon registration of the device, a request to refresh or reset the device,
where the module further:
determines, upon receiving the request to refresh or reset the device, whether the decryption key should be refreshed or preserved while the programmable communications parameters are refreshed or reset to a default state;
preserves, in response to determining that the decryption key should be preserves, the decryption key while the programmable communications parameters are refreshed or reset to the default state; and
refreshes, in response to determining that the decryption key should not be preserved, the decryption key by restoring a default decryption key or acquiring a new decryption key and returning the programmable communications parameters to the default state.

2. The device according to claim 1, where the programmable communications parameters are refreshed and the decryption key is preserved based on a configuration data stored in the memory.

3. The device according to claim 1, where the programmable communications parameters are refreshed and the decryption key is preserved based on a response entered at the interface.

4. The device according to claim 1, where the programmable communications parameters include subscriptions definitions.

5. The device according to claim 1, where the identifier includes a MAC address.

6. The device according to claim 1, where the interface receives the request via a button on the device.

7. The device according to claim 1, where the interface receives the request via a menu selection at the device.

8. A method comprising:
generating a request, including information based on an identifier associated with a device, for transmission to a first server;
receiving an encrypted configuration profile from the first server;
transmitting, in response to receiving the encrypted configuration profile, information to a second server to initiate registration of the device;
receiving, upon registration of the device, a request to reset the device;
determining, upon receiving the request to reset the device, whether a decryption key should be refreshed or preserved while programmable communication parameters are refreshed to a default state;
preserving, in response to determining that the decryption key should be preserved, the decryption key while the programmable communications parameters are refreshed to the default state; and refreshing, in response to determining that the decryption key should not be preserved, the decryption key by restoring a default decryption key or acquiring a new decryption key and returning the programmable communications parameters to the default state.

9. The method according to claim 8, where the programmable communications parameters are refreshed and the decryption key is preserved based on stored configuration data.

10. The method according to claim 8, where the programmable communications parameters are refreshed and the decryption key is preserved based on a response entered at an interface of the device.

11. The method according to claim 8, where the programmable communications parameters include subscription definitions.

12. The method according to claim 8, where the identifier includes a MAC address.

13. The method according to claim 8, where receiving the request includes receiving the request via a button on the device.

14. The method according to claim 8, where receiving the request includes receiving the request via a menu selection at the device.

15. A non-transitory computer-readable storage medium comprising:
  one or more instructions to generate a request, including information based on an identifier associated with a device, for transmission to a first server;
  one or more instructions to receive an encrypted configuration profile from the first server;
  one or more instructions to transmit, in response to receiving the encrypted configuration profile, information to a second server to initiate registration of the device;
  one or more instructions to receive, upon registration of the device, a request to reset the device;
  one or more instructions to determine, upon receiving the request to reset the device, whether a decryption key should be refreshed or preserved while the programmable communications parameters are refreshed to a default state;
  one or more instructions to preserve, in response to determining that the decryption key should be preserved, the decryption key while programmable communications parameters are refreshed to the default state; and
  one or more instructions to refresh, in response to determining that the decryption key should not be preserved, the second parameter by storing a default decryption key or acquiring a new decryption key and returning the programmable communications parameters to the default state.

16. The non-transitory computer-readable storage medium according to claim 15, where the programmable communications parameters are refreshed and the decryption key is preserved based on stored configuration data.

17. The non-transitory computer-readable storage medium according to claim 15, where the programmable communications parameters are refreshed and the decryption key is preserved based on a response entered at an interface of the device.

18. The non-transitory computer-readable storage medium according to claim 15, where the programmable communications parameters include subscription definitions.

19. The non-transitory computer-readable storage medium according to claim 15, where the identifier includes a MAC address.

20. The non-transitory computer-readable storage medium according to claim 15, where the one or more instructions to receive the request are further to receive the request via one of a button on the device or a menu selection at the device.

\* \* \* \* \*